Feb. 12, 1957  J. J. JACOBS  2,781,209
DYNAMIC SEAL FOR A CENTRIFUGAL PUMP
Filed May 3, 1954
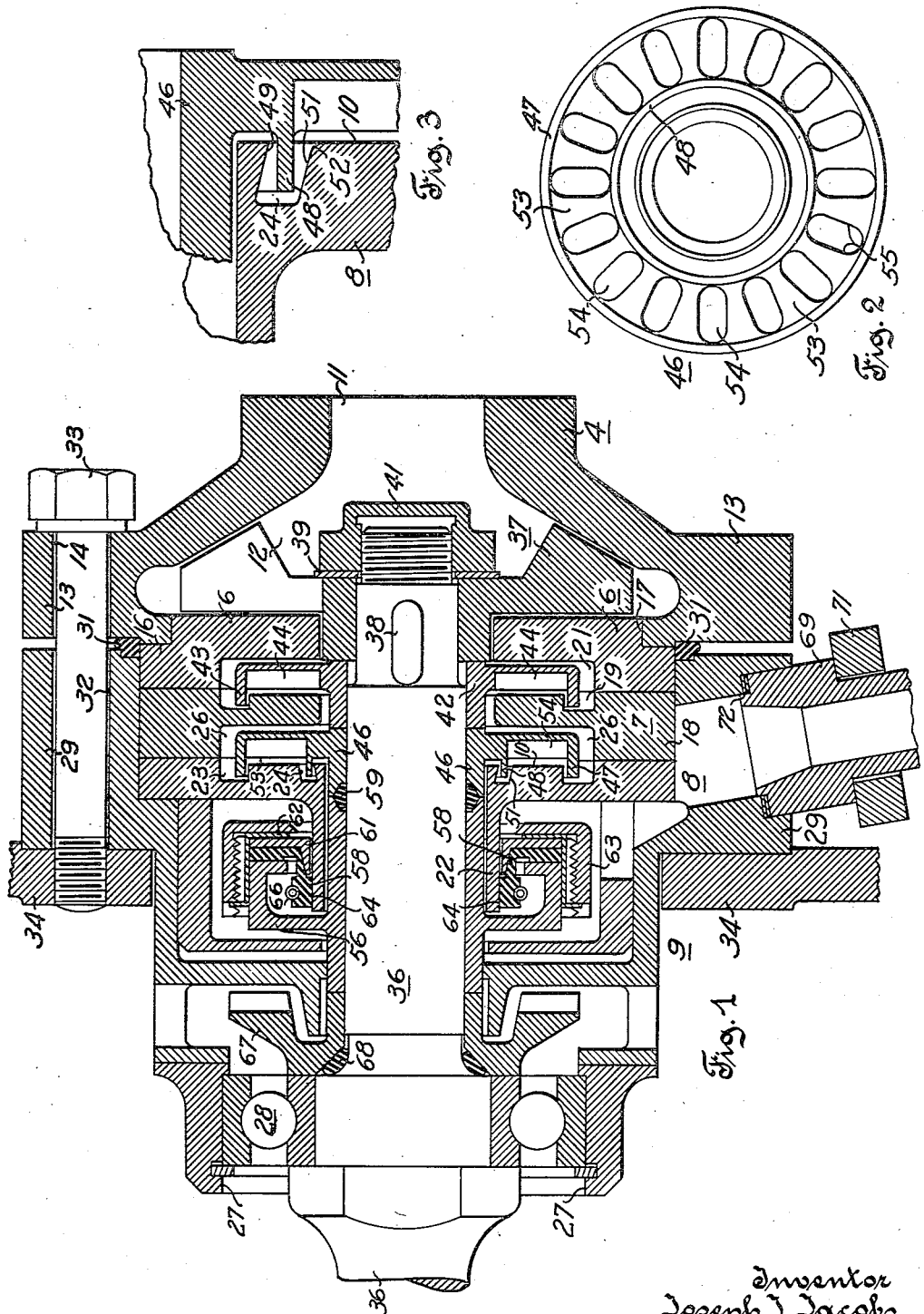
Inventor
Joseph J. Jacobs
by Steve W. Gremban
Attorney

United States Patent Office 2,781,209
Patented Feb. 12, 1957

2,781,209

DYNAMIC SEAL FOR A CENTRIFUGAL PUMP

Joseph J. Jacobs, Wauwatosa, Wis., assignor to Allis-Chalmers Manufacturing Company, Milwaukee, Wis.

Application May 3, 1954, Serial No. 426,969

5 Claims. (Cl. 286—9)

This invention relates generally to an improvement in seals for centrifugal pumps and more specifically to an improved dynamic sealing means including a stationary casing in a centrifugal pump for sealing the pump shaft to the pump casing so that there is no leakage therethrough of the fluid being pumped.

In centrifugal pumps, particularly in pumps employed for handling hydrogen peroxide, or corrosive liquids such as sodium and potassium, it is extremely important that none of the liquid being pumped leak out of the pump casing. Where corrosive liquid is pumped, any corrosive liquid leaking out of the pump might come into contact with operating personnel and cause serious burns and other injuries. Where hydrogen peroxide is pumped, there is the danger of explosions resulting from a contamination of the hydrogen peroxide either by bearing lubricant, or by any other foreign matter, since hydrogen peroxide, if confined, becomes unstable and explosive when contaminated. Heretofore, a dynamic seal comprising a pressure seal rotor has been used to prevent leakage of liquids. This prior art pressure seal rotor may be an open or closed impeller presenting a plurality of blades. In operation, liquid leaking out of the pump casing into the rotor is caught by the blades and forced radially outward by the combined action of the blades and centrifugal force thereby preventing the liquid from passing the rotor. This prior art dynamic seal has worked very satisfactorily in vertical installations where the liquid suction inlet is below the seal but has been entirely unsatisfactory in horizontal installations where the pump shaft is positioned horizontally. Applicant's invention resides in an improvement in the pressure seal rotor in combination with the casing to provide a dynamic seal that works satisfactorily in all types of pump installations having the midpoint of the liquid suction inlet below, in the same horizontal plane or slightly above the midpoint of the dynamic seal.

It is therefore an object of the present invention to provide an improved dynamic seal for a centrifugal pump that will prevent leakage of liquid from the pump in any operating position in which the midpoint of the liquid suction inlet is below, in the same horizontal plane or slightly above the midpoint of the dynamic seal.

Another object of the invention is to provide an improved dynamic seal for a centrifugal pump for preventing leakage of liquid into the pump casing along the shaft.

Objects and advantages other than those set forth above will be apparent from the following description when read in connection with the accompanying drawing, in which:

Fig. 1 is a section through a centrifugal pump embodying the invention;

Fig. 2 is an end view of a pressure seal rotor; and

Fig. 3 is an enlarged segmental section of the portion of the casing and pressure seal rotor embodying the invention.

As shown in the drawing, this invention is illustrated as applied to a centrifugal pump having a casing. Starting from the suction end shown in Fig. 1 at the right of the drawing, the casing of the pump comprises a plurality of annular parts 4, 6, 7, 8 and 9 fitted together generally in axial register to facilitate assembling and disassembling the pump. The inlet part 4 of the casing is shown as an annular disk defining a liquid suction inlet 11 leading into a cavity 12. The annular part 4 has a peripheral flange 13 through which a plurality of bolt holes 14 are positioned, only one of which is shown. The casing part 6 adjacent the part 4 is shown as an annular disk having an annular peripheral flange 16 defining an annular peripheral shoulder 17 which mates with a portion of the annular part 4. The casing part 7 adjacent part 6 is shown as an annular disk having an annular peripheral flange 18 defining an annular groove 19. The casing part 7 cooperates with the casing part 6 to define an annular cavity 21. The casing part 8 adjacent the casing part 7 is shown as an annular disk having a central portion forming an annular axially extending lip 22 defining an opening through the plate 8 and presenting an annular surface 10 facing the part 7. The annular plate 8 defines first and second annular grooves 23, 24 radially spaced from one another. The part 8 cooperates with the part 7 to define an annular cavity 26 therebetween. The casing part 9 adjacent part 8 defines an annular opening 27 at one end in which a bearing 28 shown as a ball bearing is mounted, although any other suitable type of bearing may be used. The end of part 9 adjacent part 8 has an annular peripheral flange 29 having an inner surface complementary to and encompassing the outer surface of the parts 6, 7 and 8 of the casing. An annular sealing ring 31 of suitable resilient material, such as silicone, to chemically resist the liquid being pumped is positioned around the outer surface of the casing part 6 between the flanges 13, 29. The annular peripheral flange 29 presents a plurality of openings 32 therethrough, only one of which is shown, in register with the openings 14 in the peripheral flange 13. The parts 6, 7 and 8 of the annular casing are secured together between casing parts 4 and 9 by a plurality of bolts 33, only one of which is shown, passing through the openings 14, 32 in the flanges 13, 29 respectively, and engaging threaded openings presented by an annular clamp plate 34 surrounding the part 9 of the casing. The clamp plate 34 also serves as a support for the centrifugal pump and is secured to a frame or foundation (not shown).

A shaft 36 having a threaded end is journaled in the ball bearing 28 and extends through the parts 4, 6, 7, 8 and 9 of the casing into the cavity 12 defined by part 4 of the casing. An open impeller 37 is mounted on the end of the shaft 36 within the cavity 12 and is keyed to the shaft by means of a straight key 38 and locked in place by means of a lock washer 39 and cap nut 41 engaging the threaded end of the shaft 36. A dynamic seal rotor 42 is mounted on the shaft 36 for rotation therewith adjacent the impeller 37 and positioned in the cavity 21 defined by parts 6, 7 of the casing. The dynamic seal 42, which may be any suitable type known in the art, is shown as a peripherally closed rotor having a peripheral flange 43 extending into the groove 19 of part 7 of the casing. A plurality of recesses 44 are defined by the rotor.

An improved dynamic sealing means comprising a dynamic seal rotor 46 mounted on the shaft 36 for rotation therewith adjacent the rotor 42 is positioned in the cavity 26 defined by parts 7, 8 of the casing. The dynamic seal rotor 46 is shown in Figs. 1 and 2 as a peripherally closed rotor having a first peripheral flange 47 extending into groove 23 defined by the part 8 of the casing, although the peripheral flange 47 and groove 23 may be omitted entirely and an open rotor used instead.

A second annular flange 48 as shown in Fig. 3, is radially spaced inward from the periphery of the rotor 46, and extends axially into the annular groove 24 in the part 8 of the casing. The annular groove is shown as having a radially inner face 49 and a radially outer face 51, the faces 49, 51 having outer edges formed by the merger of the faces 49, 51 respectively with the surface 10 of the casing part 8. The inner and outer faces 49, 51 define frusto-conical surfaces relative to the axis of shaft 36, although the faces 49, 51 need not necessarily define frusto-conical surfaces but may define any surface shape providing the distance of the outer edge of the radially inner face 49 from the axis is at least equal to the distance of any other point on the face 49 from the axis. Furthermore, the casing of the pump should be so disposed that the outer edge of the radially inner face 49 has at least one point below all points of the radially inner face. The outer face 51 may provide a drainage surface from which liquid deflected into the groove 24 by the annular flange 48 may drain off by gravity. The outer face 51 should preferably be made with an annular rounded edge 52 to facilitate such drainage.

In addition, the rotor 46 defines a plurality of radial ribs 53, as shown in Fig. 2, interposed between the flanges 47, 48 of the rotor 46. Interposed between the ribs 53 are a plurality of recesses 54 providing reservoirs into which liquid passing the peripheral flange 47 is received. The ribs 53 further provide blade-like edge portions 55 which act as blades when the rotor 46 is rotated to propel liquid in the recesses 54 in the direction of rotation. The rotation of the rotor 46 causes a centrifugal force to be imparted to the liquid forcing the liquid radially outward. Although ribs 53 and recesses 54 are shown, any form of blading having the proper strength characteristics and defining a channel therebetween into which liquid may pass may be used.

The part 9 of the casing presents a cavity for housing a static seal 58 which prevents liquid leakage into or from the pump casing when the pump is not operating. This is particularly desirable when the pump is under a static pressure head. The seal 58 may be any suitable type of static seal that presents a sealing surface for continuously sealing the shaft 36 to the casing until the shaft attains some predetermined rotational speed at which time the seal 58 is no longer in sealing engagement with the shaft 36. The static seal comprises a seal casing 56 mounted on the shaft 36 for rotation therewith adjacent the dynamic seal rotor 46. An annular seal ring 59 of suitable resilient material, such as silicone, capable of withstanding chemical action of the liquid being pumped, surrounds the shaft and is interposed between the rotor 46 and the seal casing 56. The static seal 58 presents an L-shaped cross section having one end positioned between the annular seal casing 56 and a seal washer 61 and held in place by means of a lock washer 62 and a lock nut 63 so that the seal 58 will rotate with the seal casing 56. The annular seal 58 has an inner surface 64 surrounding the annular lip 22 of part 8 of the casing, and is mounted in sealing relation thereto by an annular expandible holding spring 66 surrounding the outer surface of the seal 58. The seal 58, therefore, is in sealing engagement with the annular lip 22 while the centrifugal pump is not operating. When in operation, centrifugal force imparted to the annular seal 58 causes the expandible holding spring 66 to expand outward at some predetermined speed of the shaft 36 thereby disengaging the seal 58 from the annular lip 22 so that the seal is not in sealing engagement with the stationary annular lip 22.

Axially interposed between the ball bearing 28 and the seal casing 56 is an oil slinger disk 67 mounted on the shaft 36 and positioned in a cavity defined by part 9 of the casing. The oil slinger disk 67 provides an oil seal while the pump is operating by slinging radially outward any oil that leaks out of the ball bearing 28. An annular seal ring 68 of suitable chemical resisting material, such as silicone, is positioned around the shaft 36 between the shaft and the oil slinger disk 67.

A drain conduit 69 is connected to an opening in the annular flange 29 of part 9 of the casing and communicates with the cavity in which the static seal 58 is housed. The drain conduit 69 is secured to the annular flange 29 by an annular clamp plate 71. A gasket 72 is interposed between the drain conduit 69 and the annular flange 29 to prevent leakage therebetween.

In operation, the shaft 36 is connected to some form of driving means (not shown) whereby the shaft 36 and the impeller 37 mounted thereon are rotated. The action of the impeller 37 draws liquid through the liquid suction inlet 11 and discharges the liquid through a discharge nozzle (not shown). Since the impeller 37 is of the open design, the cavity 21, in which the dynamic seal 42 is positioned, is subjected to suction pressure. Any liquid that is forced past the annular peripheral flange 43 of the rotor 42 in cavity 21 by the suction pressure is caught in the recesses 44 of the rotor and is thrown radially outward around the annular flange 43 by the centrifugal force imparted to the liquid by the rotating rotor 42 and is forced back into cavity 21. Any liquid leaking past the first rotor 42 into the cavity 26 in which the improved dynamic seal rotor 46 is positioned is propelled by the ribs 53 of rotor 46 and acted upon by centrifugal force resulting from the rotation of the rotor 46 to force the liquid back into cavity 21. Any liquid leaking along surface 10, particularly where the part 8 is constructed of a material such as stainless steel presenting a surface 10 that is highly polished, thereby offering little resistance to liquid flow thereon, will be stopped either by the annular flange 48 and deflected into the recess 54 or will run into the annular groove 24 and drain by gravity from the face 51 (see Fig. 3) back into the recesses 54 where the liquid is once again acted upon by centrifugal force forcing the liquid back into cavity 21.

Although but one embodiment has been illustrated and described, it will be apparent to those skilled in the art that various changes and modifications may be made therein without departing from the spirit of the invention or from the scope of the appended claims.

It is claimed and desired to secure by Letters Patent:

1. In a machine for pumping liquid having a stationary casing, a shaft rotatably mounted in said casing, dynamic seal means including said casing for sealing said shaft to said casing when said shaft is rotating, said seal means comprising: a rotor rotatably mounted on said shaft in said casing; an annular flange presented by said rotor on one side thereof radially spaced from the outer periphery of said rotor; a plurality of blades presented by said rotor on said one side, said blades extending between said flange and said periphery of said rotor; and an annular groove having a radially inner face defined by said casing, said groove complementing and encompassing said annular flange and being so disposed that the outer edge of said radially inner face has at least one point below and one point above all points of said radially inner face away from said edge, said rotor cooperating with said groove upon rotation of said shaft to provide liquid sealing between said casing and said shaft.

2. In a centrifugal pump having a casing defining an impeller chamber, a bearing mounted in said casing, an impeller shaft rotatable about its longitudinal axis journaled in said bearing and passing through said casing into said impeller chamber, dynamic seal means including said casing for sealing said shaft to said casing when said shaft is rotating, said seal means comprising: a rotor rotatably mounted on said shaft in said casing; an annular flange presented by said rotor on said one side for deflecting liquid striking said flange, said flange being radially spaced from the outer periphery of said rotor; a plurality of radial ribs defined by said rotor on said one side, said ribs defining recesses therebetween for receiving liquid passing said outer periphery of said rotor, said recesses being interposed between said flange and said outer periphery of said rotor, said ribs presenting edge portions for forcing said liquid radially outward upon rotation of said shaft; and said casing defining an annular groove, said groove complementing and encompassing said flange, said groove having a radially inner face and being so disposed that the outer edge of said inner face has at least one point below and one point above all the points of said inner face away from said edge, and said groove cooperating with said flange to provide liquid sealing between said casing and said shaft.

3. In a centrifugal pump having a casing defining an impeller chamber, a bearing mounted in said casing, an impeller shaft rotatable about its longitudinal axis journaled in said bearing and passing through said casing into said impeller chamber, dynamic seal means including said casing for sealing said shaft to said casing when said shaft is rotating, said seal means comprising: a rotor rotatably mounted on said shaft in said casing; an annular flange presented by said rotor on said one side for deflecting liquid striking said flange, said flange being radially spaced from the outer periphery of said rotor; a plurality of radial ribs defined by said rotor on said one side, said ribs being interposed between said annular flange and said periphery of said rotor, said ribs defining recesses therebetween for receiving liquid passing said first flange, said ribs further presenting blade like edge portions for forcing said liquid radially outward upon rotation of said shaft; said casing defining an annular groove, said groove complementing and encompassing said flange and receiving liquid deflected by said flange; and said groove having a radially inner face and being so disposed that the outer edge of said radially inner face has at least one point below all points of said radially inner face away from said edge, said point further being radially removed from said axis at least as far as the most radially removed point of said radially inner face away from said edge.

4. In a centrifugal pump having a stationary casing defining an impeller chamber, a bearing mounted in said casing, an impeller shaft rotatable about its longitudinal axis journaled in said bearing and passing through said casing into said impeller chamber, dynamic seal means including said stationary casing for sealing said shaft to said casing when said shaft is rotating, said seal means comprising: a rotor rotatably mounted on said shaft in said casing; an annular flange presented by said rotor on said one side for deflecting liquid striking said flange, said flange being radially spaced from the outer periphery of said rotor; a plurality of radial ribs defined by said rotor on said one side, said ribs radially extending from said annular flange to said periphery of said rotor, said ribs defining recesses therebetween for receiving liquid passing said first flange, said ribs further presenting blade like edge portions for forcing said liquid radially outward upon rotation of said shaft; said casing defining an annular groove, said groove complementing and encompassing said flange and receiving liquid deflected by said flange; said groove having a radially inner face and a radially outer face and being so disposed that the outer edge of said radially inner face has at least one point below and one point above all points of said radially inner face away from said edge, and said radially outer face having an outer edge merging with one side of said casing to define an annular rounded edge therebetween.

5. In a centrifugal pump having a stationary casing defining an impeller chamber, a bearing mounted in said casing, an impeller shaft rotatable about its longitudinal axis journaled in said bearing and passing through said casing into said impeller chamber, dynamic seal means including said stationary casing for sealing said shaft to said casing when said shaft is rotating, said seal means comprising: a peripherally closed rotor rotatably mounted on said shaft in said casing; a first peripheral annular flange presented by said rotor on one side thereof; a second annular flange presented by said rotor on said one side for deflecting liquid striking said second flange, said second flange being radially spaced from said first flange; a plurality of radially extending ribs defined by said rotor on said one side, said ribs being interposed between said first flange and said second flange and extending radially outward from said second flange to said first flange, said ribs being equidistantly spaced from one another, said ribs defining recesses therebetween for receiving liquid passing said first flange, said ribs further presenting blade like edge portions for forcing said liquid radially outward upon rotation of said shaft; said casing defining first and second annular grooves, said first groove complementing and encompassing said first flange, said second groove complementing and encompassing said second flange and receiving liquid deflected by said second flange; and said second groove having a radially inner face and a radially outer face parallel to one another, said second groove being so disposed that the outer edge of said radially inner face has at least one point below all points of said radially inner face away from said edge, said point further being radially removed from said axis a greater distance than the most radially removed point of said radially inner face away from said edge, and said radially outer face having an outer edge merging with one side of said casing to define an annular rounded edge therebetween.

References Cited in the file of this patent
UNITED STATES PATENTS

| | | |
|---|---|---|
| 1,732,761 | Marsland | Oct. 22, 1929 |
| 2,649,050 | Dibdin | Aug. 18, 1953 |